United States Patent [19]

Miller

[11] Patent Number: 5,056,203
[45] Date of Patent: Oct. 15, 1991

[54] ABRADING AND CUTTING TOOL ASSEMBLY

[76] Inventor: Darrell W. Miller, 4925 Young Dr., Pittsburgh, Pa. 15227

[21] Appl. No.: 680,739

[22] Filed: Apr. 5, 1991

Related U.S. Application Data

[63] Continuation-in-part of Ser. No. 34,666, Apr. 6, 1987, abandoned.

[51] Int. Cl.$^5$ .............................................. B23D 67/01
[52] U.S. Cl. ....................................... 29/78; 29/76.1; 30/172; 51/170 R
[58] Field of Search ....... 51/170 R, 170 TL, 170 MT, 51/204, 205 R, 392, 393; 29/76, 78, 79, 80, 76.1; 30/172

[56] References Cited

U.S. PATENT DOCUMENTS

| | | | |
|---|---|---|---|
| 1,861,940 | 12/1928 | Roos et al. | 51/170 TL |
| 1,895,961 | 1/1933 | Amaru | 30/172 |
| 2,233,657 | 3/1941 | Wallace | 30/172 |
| 3,284,898 | 11/1966 | Hopkins | 29/76 |

*Primary Examiner*—D. S. Meislin
*Assistant Examiner*—Lawrence Cruz
*Attorney, Agent, or Firm*—Paul Bogdon

[57] ABSTRACT

An abrading and cutting tool assembly particularly adapted for use in auto body repair is disclosed. The assembly includes a tool body of a rectangular, disc, or cylindrical shape, and means on the tool body for connecting it to a drive assembly such as a reciprocating or revolving sander assembly. A plurality of successive spaced cutting and abrading blades, all of which have a toothed, saw-like cutting edge, are secured at an acute angle to the surface of the tool body. The ideal angle the blades make with the surface of the tool body is 45 degrees, and all of the blades are inclined and facing the same direction for abrading and cutting.

10 Claims, 3 Drawing Sheets

ABRADING AND CUTTING TOOL ASSEMBLY

RELATIONSHIP TO OTHER PATENT APPLICATIONS

This Patent Application is a Continuation-In-Part of U.S. patent application, Ser. No. 034,666 filed April 6, 1987, now abandoned, in the name of DARRELL W. MILLER for Abrading and Cutting Tool Assembly.

BACKGROUND OF THE INVENTION

This invention relates to an abrading and cutting tool assembly for use with power or hand operated drive assemblies, such as reciprocating or revolving sanders, and particularly to an abrading and cutting tool assembly adapted for use in auto body repair.

In repairing damaged auto bodies the common practice is to spread a mixed plastic material evenly over the damaged area. The commonly used body plastic chemically hardens in about ten to fifteen minutes leaving a sticky or tacky surface. Prior to sanding the repaired surface the body plastic is precut and the tacky surface removed. A hand held body grinder is often used for the pre-cutting and tacky surface removal. Occasionally a cheese shredder type cutter is used on the body plastic before it hardens. The cheese shredder cutter will remove the tacky surface and will pre-cut the body plastic.

Both the grinding and cheese shredder cutting processes present inherent problems in auto body repair. The grinding process results in a great amount of body plastic dust being generated. The airborne dust creates a health hazard to the auto body worker and to others in the work area. The dust is also carried to the area surrounding the work, creating conditions which require time consuming cleaning. It has also been found that grinding of the body plastic often results in more material being removed than is desired, requiring repeated applications of body plastic and grinding to achieve the final shape and surface condition. Repeated application of body plastic and grinding increases job cost because of the added time and material needed to achieve a final repair condition. The cheese shredder cutter process is limited in that the cutter is only effective when used prior to hardening or curing of the body plastic. The curing time of body plastic may be as short as five minutes on a warm day. Oftentimes the pre-cutter process is not achievable within the short curing time and the worker must resort to grinding.

This invention overcomes the problems inherent in the grinding and cheese shredder cutting processes for pre-cutting body plastic and tacky surface removal. An abrading and cutting tool assembly is provided which reduces the time required to pre-cut body plastic and remove the tacky surface while practically eliminating airborne dust generation, enhancing the safety of workers and greatly reducing the time necessary for cleaning the work area. The present invention also results in the body plastic being finished without the need for time consuming and material wasteful repeat operations. The use of my invention also avoids the need of finishing body plastic prior to curing, thus avoiding the oftentimes rush to finish which frequently results in the finishing work being poorly and improperly achieved only to have to be repeated.

SUMMARY OF THE INVENTION

This invention provides an abrading and cutting tool assembly particularly adapted for use in auto body repair work and useable with power drive assemblies or with manually operated assemblies. My abrading and cutting tool assembly preferably comprises: a tool body which may be a flat or curved rectangular, disc, or cylindrically shaped; attaching means on the tool body for securing the tool body to a drive assembly such as a manually held and motivated sander, or a motor driven reciprocating or rotating sander or grinder; a plurality of successively spaced elongated cutting and abrading blades secured at an acute angle to the surface of the tool body, each of the blades having toothed cutting edges, with the acute angle that each blade makes with the surface of the tool body being anywhere between about twenty degrees and about seventy degrees, and all of the blades being inclined and facing the same direction for abrading and cutting. The optimum and most efficient angle of the blades is around forty-five degrees. This invention is used in auto body work after the body plastic is applied to the damaged area. At this point the selected shape abrading and cutting tool is used, either manually motivated or power driven, to pre-shape the body plastic and remove the tacky surface. Instead of fine plastic powdered dust being generated, as is the case with conventional grinding, larger plastic particles result which, because of their size, drop directly onto the floor around the work area. The powdered dust formed during conventional grinding operations will blow into the air and settle all around the work shop or be ingested by people in the area. The larger particles created by using this invention considerably reduce the potential ingestion by workers since the particles drop rapidly to the floor. Also, the larger plastic particles are easily swept and cleaned as compared to fine dust, resulting in decreased clean-up time. It has also been found that using the abrading and cutting tool of my invention eliminates scalping and gouging of the body plastic that tends to occur during conventional grinding. Eliminating scalping and gouging of the body plastic reduces the need for expensive, time consuming re-coating and pre-cutting body plastic. In summary, use of my abrading and cutting tool in contrast to standard grinding methods results in a great reduction in the total body plastic finishing time and a reduction in amount of body plastic material required to complete a repair job and, consequently, a significant savings in the cost of labor and material.

Various other advantages, details, and modifications of the present invention will become apparent as the following description of certain preferred embodiments proceeds.

DESCRIPTION OF THE DRAWINGS

In the accompanying drawings I show certain present preferred embodiments invention in which.

DESCRIPTION OF PREFERRED EMBODIMENTS

Figure 1:
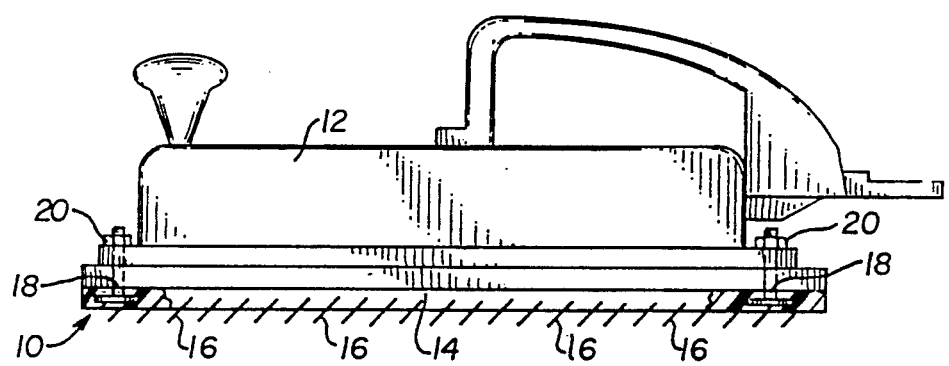
FIG. 1 is a side elevation view of the abrading and cutting tool of my invention showing a generally rectangular tool body secured to a reciprocating, power driven sander.
Figure 2:
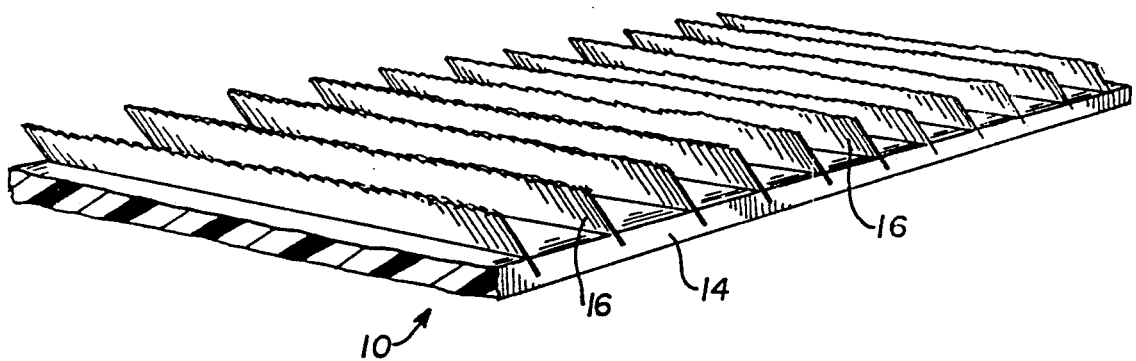
FIG. 2 is a partial perspective view of the tool of FIG. 1 showing the toothed cutting edges of the blades forming part of my invention.

Referring now to the drawings and particularly to FIGS. 1 and 2, there is shown one embodiment of the abrading and cutting tool 10 of my invention secured to a pneumatic reciprocating power drive assembly 12 commonly referred to as an air board or reciprocating sander. Abrading and cutting tool 10 includes a generally flat rectangular shaped tool body 14 formed of any suitable metallic or non-metallic material. As illustrated, tool body 14 is formed of a thermosetting, plastic material into which is embedded a plurality of successively spaced steel blades 16, all at an acute angle to the planar surface of the tool body. The blades 16 are all inclined in the same direction and are at substantially at the same angle to the tool body 14. As clearly shown in FIG. 2, each blade 16 has a toothed cutting edge much like would be found on standard hacksaw blades. The toothed cutting edges of the blades 16 are a critical feature of this invention as is the angle made by the blades with the tool body 14. The criticality of the toothed cutting edges and the angles pertain to all of the embodiments of this invention including, but not limited to, those to be described hereinafter. It has been found that straight or curved cutting edges will not effectively remove body plastic from repaired items, such as auto body parts, and that blades at angles greater than about 70 degrees or less than about 20 degrees with respect to the tool body surface will likewise not effectively remove body plastic material. As to the present invention toothed blades 16 inclined between the angles of about 20 degrees and about 70 degrees will effectively remove body plastic from repaired parts without creating airborne dust and with a reduced tendency of scalping or gouging the body plastic. Tests have been conducted and the results show that my invention works effectively with the blades 16 arranged at angles between about 20 degrees and about 70 degrees with respect to the tool body surface. By extrapolating the test observations it is believed that the effective range of blade angles may be extended to 10 degrees to 80 degrees. It has been found that the most efficient angle of inclination for the blades 16 is about 45 degrees to the surface of the tool body 14 or any shaped tool bodies.

As shown in FIG. 1, the tool body 14 is provided with a pair of oppositely arranged bolts 18 embedded within the body and projecting above its upper surface. The tool body 14 is secured to the sander 12 by engaging nuts 20 to the bolts 18. Other forms of attachment means, all well-known in this art, may be used for securing the tool body 18 to a power drive. For example, clips may be arranged on the tool body in position to engage mating slots on the power drive; and an adhesive may be applied to the upper surface of tool body 16 and secured to the bottom of the power drive.

Figure 3:
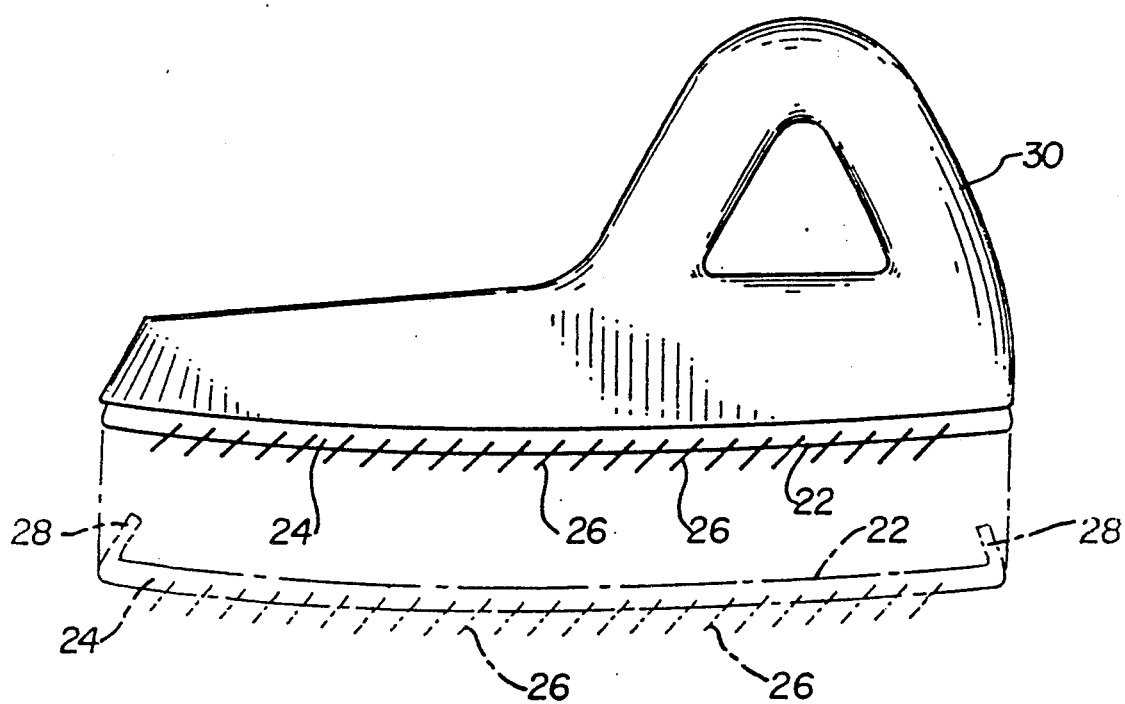
FIG. 3 is a side elevation view of the abrading and cutting tool of my invention showing a generally curved, rectangular tool body secured to a hand-held, manually motivated sander.
Figure 3A:
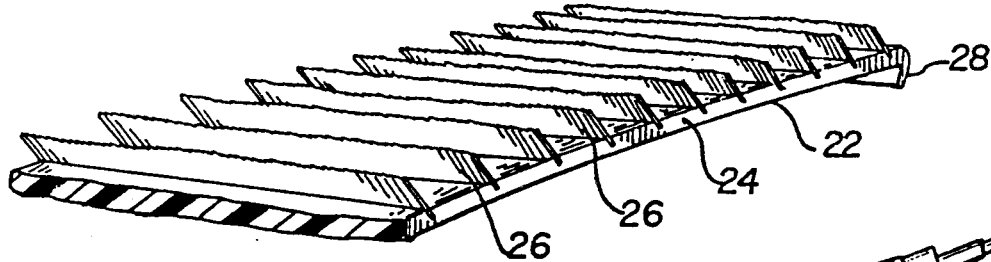
FIG. 3A is a partial perspective view of the tool of FIG. 3 showing the toothed cutting edge of the blade forming part of my invention.

FIGS. 3 and 3A show another abrading and cutting tool 22 embodying my invention. Tool 22 is essentially the same as that shown in FIGS. 1 and 2, and has a curved and rectangular tool body 24 formed of a thermosetting plastic material embedding a plurality of successively spaced steel blades 26, each being inclined at an acute angle, preferably 45 degrees, to the surface of the body 24. Each blade 26 has a toothed cutting edge. A pair of oppositely arranged clips 28 are secured to the upper sections of the tool body 22. The clips 28 serve to secure the tool body 24 to a hand-held, manually motivated planing-like tool holder 30.

Figure 4:
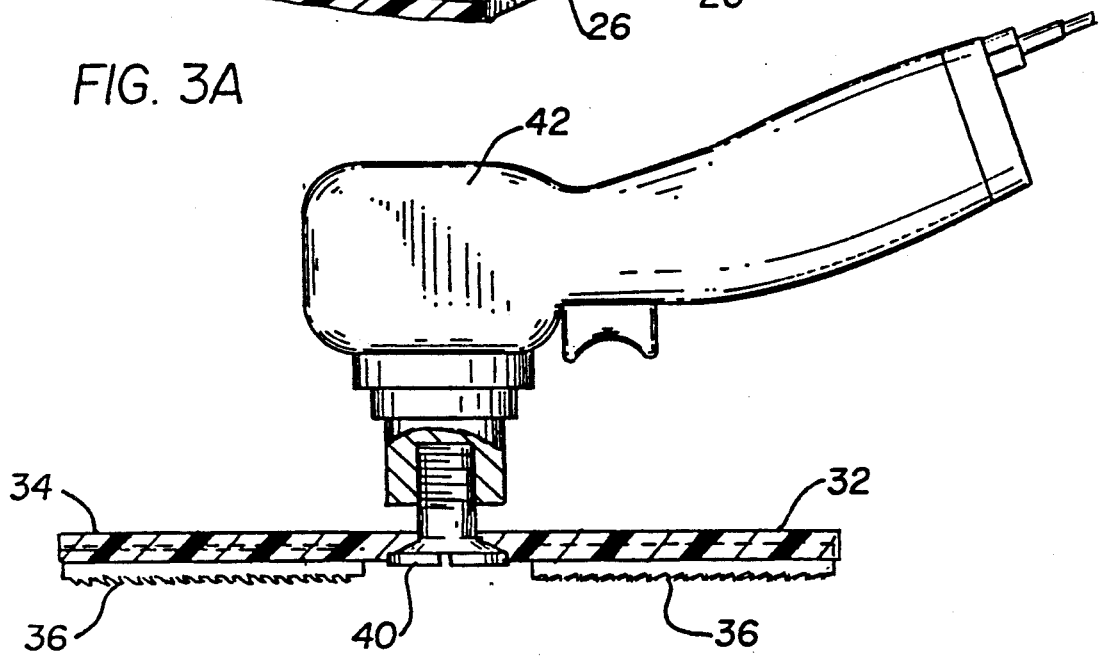
FIG. 4 is a side elevation view of the abrading and cutting tool of my invention showing a disc-shaped tool body secured to a power driven sander.
Figure 5:
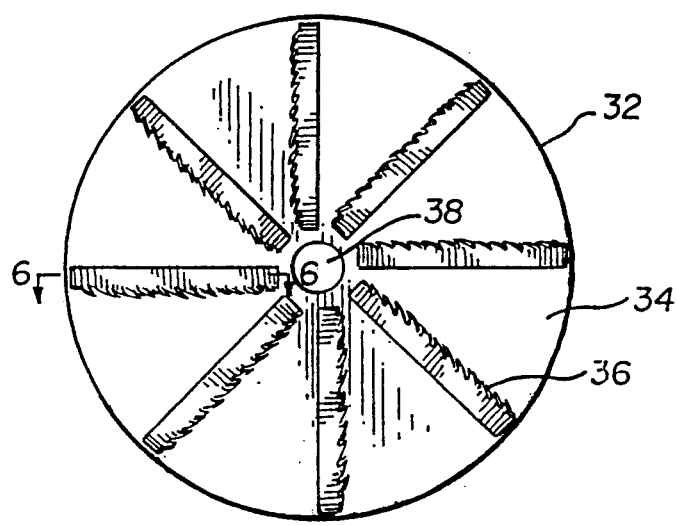
FIG. 5 is a bottom plan view of the cutting tool of FIG. 4.
Figure 6:
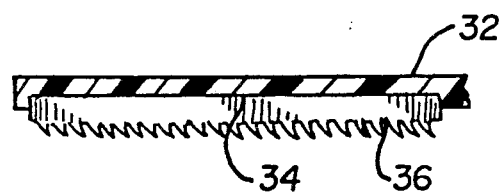
FIG. 6 is a section view along line VI—VI of FIG. 5.

FIGS. 4 through 6 show yet another abrading and cutting tool 32 embodying my invention. Tool 32 includes a disc shaped tool body 34 formed of a thermosetting plastic material embedding a plurality of radially extending equally arcuately spaced steel blades 36 all having toothed cutting edges. Tool body 34 is provided with a central opening 38, shown clearly in FIG. 5, through which a centering bolt 40 may pass to secure the tool body 34 to a rotating pneumatic power drive assembly 42 or an electrical rotating power drive. As is the case with the previously described embodiments of this invention, various other attachment means, such as adhesives or clips, may be used with tool body 34 for securing it to a power drive assembly. The inclination of the toothed blades 36 would be in the direction of rotation of the power drive 42.

Figure 7:
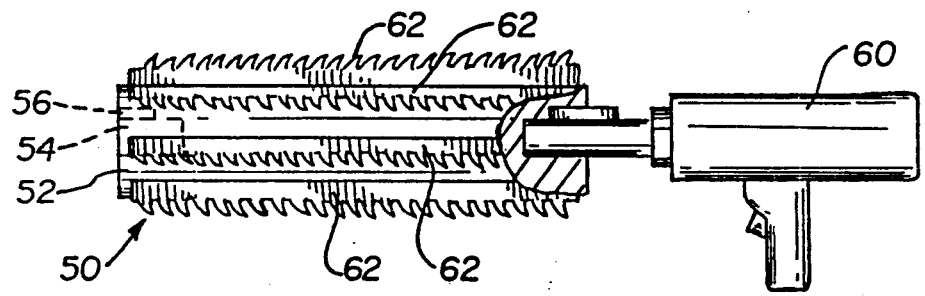
FIG. 7 is a side elevation view of the abrading and cutting tool of my invention showing a generally cylindrically shaped tool body secured with a rotatable power drive.
Figure 8:
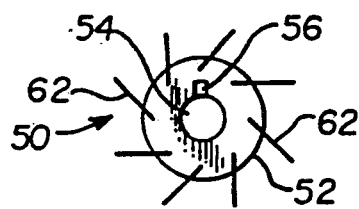
FIG. 8 is an end view of the tool of FIG. 7.

FIGS. 7 and 8 show still another abrading and cutting tool embodying my invention. Tool 50 includes a cylindrically shaped tool body 52 formed of a thermosetting plastic material. Tool body 52, as illustrated, is generally solid throughout being provided with oppositely arranged, axially disposed cylindrical slots 54 with keyways 56 formed therein. The slots 54 and keyways 56 are sized to snugly receive the drive shaft and key of a rotating electrical or pneumatic power drive 60. Embedded within the outer surface area of the body are a plurality of longitudinally extending equally, arcuately spaced blades 62, each being inclined at an acute angle to the surface of the tool body. The inclination of each of the blades 62 is in the direction of rotation of the power drive 60.

The manner of using the abrading and cutting tool of my invention, in all of its embodiments, was earlier described in this specification. The particular embodiment to be used would depend on the shape and size of the work to be pre-cut. For example, a large, flat area upon which body plastic was applied could be pre-cut with the rotary assembly of FIGS. 4 through 6, while a narrow, curved repaired area might be pre-cut with the cylindrical embodiment of FIGS. 7 and 8. As to the manually motivated embodiment of FIGS. 3 and 3A, I have found that it is particularly adaptable for use on uncured body plastic and results in a very rapid elimination of excess body plastic, including the removal of the tacky surface. Initial passes of the tool of FIGS. 3 and 3A over the body plastic removes particles much larger than the particles removed when the body plastic was fully cured. As the curing process continues and further hand pre-cutting continues, the particles removed become smaller in size. The particle size of the removed material continues to reduce until the body plastic is fully cured. Although the pre-cutting using the manually motivated tool is limited to the time for curing, it does not present a problem since the body plastic removal is so rapid. In addition to working rapidly the manually motivated tool is particularly effective in that it is useable without any tendency to scalp or gouge the body plastic. As to scalping and gouging it is to again be noted that the power driven tools of this invention also diminish the tendency to scalp or gouge, although not as great as with the manually motivated tool.

It should now be appreciated by those skilled in this art that my invention is simply and inexpensively constructed while providing the advantages over grinding or reduction in overall body plastic finishing time and reduction of body plastic material required to complete a repair job, as well as a significant reduction in generating airborne fine granule dust and reduction in clean-up time of the work area. It should also be apparent that various modifications are available to the embodiments of the abrading and cutting tool of my invention. For example, the blades may be secured to tool bodies by mechanical means such as rivets or screws; the ends of my blades may be rounded for working in rounded work areas; and various other means than those described could be used for securing the tool bodies to power or manual drive assemblies. As to attaching means for the tool body, the upper surface of the tool body itself could serve as such means when the tool body is secured to a drive assembly by an adhesive. It is also to be understood that my invention is useable in any manner where a material is to be shaped and is not to be limited to use only in auto body repair.

While I have shown and described certain present preferred embodiments of this invention, it is to be distinctly understood that the invention is not limited thereto, but may be otherwise embodied within the scope of the following claims.

I claim:

1. An abrading and cutting tool comprising:
   a tool body;
   attaching means on said tool body for securing said tool body to a drive assembly; and
   a plurality of successively spaced elongated cutting and abrading blades secured in fixed, unmovable relationship at an acute angle to the surface of said tool body, each of said blades having toothed cutting edges, said acute angle each blade makes with the surface of said tool body being about 45 degrees, and all of said blades being inclined and facing the same direction for abrading and cutting.

2. An abrading and cutting tool comprising:
   a tool body;
   attaching means on said body for securing said tool body to a drive assembly; and
   a plurality of successively spaced elongated cutting and abrading blades in fixed, unmovable relationship at an acute angle to the surface of said tool body, each of said blades having toothed cutting edges, said acute angle each blade makes with the surface of said tool body being between about 20 degrees and about 80 degrees, and all of said blades being inclined and facing the same direction for cutting and abrading.

3. An abrading and cutting tool as set forth in claims 1 or 2 wherein each of said blades makes substantially the same acute angle with the surface of said tool body.

4. An abrading and cutting tool as set forth in claims 1 or 2 wherein said tool body is a generally elongated rectangular shaped flat body; wherein said blades are laterally secured at acute angles to the surface of said flat body; and wherein said attaching means is for securing said flat body to a reciprocating drive assembly.

5. An abrading and cutting tool as set forth in claims 1 or 2 wherein said tool body is a generally flat disc; wherein said blades are radially secured to said flat disc at acute angles to the surface of said disc; and wherein said attaching means is for securing said disc to a rotating power drive assembly.

6. An abrading and cutting tool as set forth in claims 1 or 2 wherein said tool body is a cylindrically shaped body; wherein said blades are longitudinally secured to said cylindrically shaped body; and wherein said attaching means is for securing said cylindrically shaped body to a rotating power drive assembly.

7. An abrading and cutting tool as set forth in claims 3, 4 or 5 wherein said blades are uniformly spaced from each other.

8. An abrading and cutting tool as set forth in claims 3, 4 or 5 wherein said blades make substantially the same acute angles with the surface of the respective tool bodies.

9. An abrading and cutting tool as set forth in claims 3, 4 or 5 including portable power drive assemblies secured to each of the respective tool bodies.

10. An abrading and cutting tool as set forth in claims 1 and 2 wherein said toothed cutting edges of said blades are irregular hacksaw blade-type cutting edges.

* * * * *